US012655349B2

(12) United States Patent
Chappellet et al.

(10) Patent No.: US 12,655,349 B2
(45) Date of Patent: Jun. 16, 2026

(54) LIQUID CRYSTAL COMPOUNDS

(71) Applicant: ROLIC TECHNOLOGIES AG, Allschwil (CH)

(72) Inventors: Sabrina Chappellet, Allschwil (CH); Tobias Von Arx, Allschwil (CH)

(73) Assignee: ROLIC TECHNOLOGIES AG, Allschwil (CH)

( * ) Notice: Subject to any disclaimer, the term of this patent is extended or adjusted under 35 U.S.C. 154(b) by 115 days.

(21) Appl. No.: 18/566,863

(22) PCT Filed: Jul. 22, 2022

(86) PCT No.: PCT/EP2022/070602
§ 371 (c)(1),
(2) Date: Dec. 4, 2023

(87) PCT Pub. No.: WO2023/006599
PCT Pub. Date: Feb. 2, 2023

(65) Prior Publication Data
US 2024/0209263 A1 Jun. 27, 2024

(30) Foreign Application Priority Data
Jul. 28, 2021 (EP) .................................... 21188248

(51) Int. Cl.
*C09K 19/18* (2006.01)
*C09K 19/04* (2006.01)
*C09K 19/32* (2006.01)

(52) U.S. Cl.
CPC ............ *C09K 19/18* (2013.01); *C09K 19/322* (2013.01); *C09K 2019/0448* (2013.01)

(58) Field of Classification Search
CPC ...................................................... C09K 19/32
See application file for complete search history.

(56) References Cited

U.S. PATENT DOCUMENTS 5,798,147 A 8/1998 Beck et al.
2015/0376505 A1 12/2015 Gotoh et al.
2021/0002556 A1* 1/2021 Goto .................... G02B 5/3016

FOREIGN PATENT DOCUMENTS

CN 112538358 A 3/2021
EP 1 090 325 U 12/1999
EP 1462485 A1 * 9/2004 ........... C09B 69/106
WO 2012/085048 A1 6/2012

OTHER PUBLICATIONS

International Search Report for PCT/EP2022/070602 dated Oct. 28, 2022.
Written Opinion for PCT/EP2022/070602 dated Oct. 28, 2022.

* cited by examiner

*Primary Examiner* — Chanceity N Robinson
(74) *Attorney, Agent, or Firm* — Sughrue Mion, PLLC

(57) ABSTRACT

Polymerizable liquid crystals are compounds having the following formula (I), liquid crystal polymer (LCP) mixtures include these compounds, LCP networks include these compounds and mixtures, optical or electro-optical devices include these compounds, mixtures, and networks, and methods form these networks and optical or electro-optical devices by using a compound having the following formula (I):

(I)

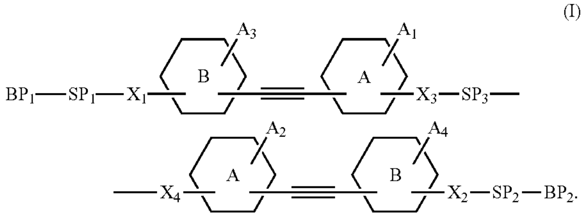

11 Claims, No Drawings

LIQUID CRYSTAL COMPOUNDS

CROSS REFERENCE TO RELATED APPLICATIONS

This application is a National Stage of International Application No. PCT/EP2022/070602 filed Jul. 22, 2022, claiming priority based on European Patent Application No. 21188248.5 filed Jul. 28, 2021.

The present invention relates to substituted curable Liquid Crystal (LCPs) with high optical anisotropy and the use of such LCPs in the preparation of substantially uniform or patterned film in which the orientation of the LCP molecules can be controlled.

In the display industry optical LCP films are used for the provision or enhancement of optical or electro optical effects, such as for polarizers. Displays are getting more and more thinner. Hence, there is a growing demand from this industry for thinner optical LCP films, such as retardation films, providing the desired optical or electro-optical effects.

Retardation films are a type of optical elements which change the polarization state of light passing through the same. When light passes through a phase retarder its polarization direction changes because of the birefringence and the thickness of the phase retarder. One of the biggest issues in preparation of phase retarders is to prepare high performing films at a small charge. When liquid crystals having high birefringence are used, it is possible to realize the necessary retardation value with small quantities of liquid crystals compounds.

High birefringence LCP materials with high birefringence could give access to thin optical films, especially thin retardation films.

Therefore, it was the task of the present invention to search for new LCP material having high birefringence and are applicable for optical films.

A first aspect of the present invention provides a compound, preferably a liquid crystal, of formula (I)

(I)

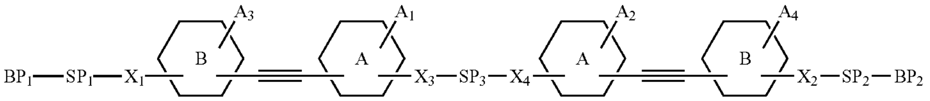

wherein

A and B each independently from each other represents an unsubstituted or substituted carbocyclic or heterocyclic aromatic group selected from a monocyclic ring of five or six atoms, two adjacent monocyclic rings of five or six atoms, a bicyclic ring system of eight, nine or ten atoms, or a tricyclic ring system of thirteen or fourteen atoms;

$SP_1$, $SP_2$ and $SP_3$ each independently from each other represents a substituted or unsubstituted, straight-chain or branched $C_1$-$C_{18}$ alkylene group, in which one, two, three or four more $CH_2$, CH or C groups are unreplaced or replaced by groups selected from the group consisting of —CH═CH—, —C≡C—, —O—, —S—, —NR'CO—, —COO—, —OOC—, —CONR'—, —OCOO—, —OCONR' with the proviso that the spacer group does not contain two adjacent heteroatoms;

$X_1$, $X_2$, $X_3$ and $X_4$ each independently from each other is selected from the group consisting of —O—, —S—, —NR'—, —CO—, —COO—, —OOC—, —CONR'—, —OCOO—, —OCONR' and a single bond;

R' is selected from the group consisting of hydrogen, a $C_1$-$C_{18}$ alkyl group;

$BP_1$ and $BP_2$ each independently from each other represents a polymerizable group, $A_1$, $A_2$, $A_3$ and $A_4$ each independently from each other are selected from the group consisting of hydrogen, —OR, —COOR, —OCOR, —CONR, —OCOOR, —OCONR and a $C_1$-$C_{18}$alkyl group, wherein R is selected from the group consisting of hydrogen; unsubstituted or substituted carbocyclic or heterocyclic aromatic group selected from a monocyclic ring of five or six atoms, two adjacent monocyclic rings of five or six atoms, a bicyclic ring system of eight, nine or ten atoms, or a tricyclic ring system of thirteen or fourteen atoms; a substituted or unsubstituted, straight-chain or branched $C_{1-18}$ alkyl group, in which one, two, three or four more $CH_2$, CH or C groups are unreplaced or replaced by groups selected from the group consisting of —CH═CH—, —C≡C—, —O—, —S—, —NR"CO—, —COO—, —OOC—, —CONR"—, —OCOO—, —OCONR" with the proviso that the spacer group does not contain two adjacent heteroatoms, wherein R" is selected from the group consisting of hydrogen, a $C_1$-$C_{18}$ alkyl group.

Preferred is a compound of formula (I), wherein

A and B each independently from each other represents five, six, ten or fourteen ring atoms, preferably A and B each independently from each other represents furan, benzene, especially phenylene; pyridine, triazine, pyrimidine, naphthalene, phenanthrene, biphenylene or tetralin group, which are unsubstituted or substituted;

more preferably A and B each independently from each other represents naphthalene, phenanthrene, biphenylene or phenylene, which are unsubstituted or substituted;

most preferably A and B each independently from each other represents naphthalene, biphenylene or phenylene, which are unsubstituted or substituted, and especially most preferably A is phenylene and B naphthalene, which are unsubstituted or substituted;

$SP_1$, $SP_2$ and $SP_3$ each independently from each other represents a substituted or unsubstituted, straight-chain or branched $C_1$-$C_{18}$ alkylene group, preferably $C_1$-$C_{12}$ alkylene group, more preferably $C_1$-$C_{10}$ alkylene group, most preferably $C_1$-$C_8$ alkylene group, and especially most preferably $C_1$-$C_6$ alkylene group, and more especially most preferably $C_3$-$C_6$ alkylene group, in which one, two, three or four more $CH_2$, CH or C groups are unreplaced or replaced by groups selected from the group consisting of —CH═CH—, —C≡C—, —O—, —S—, —NR'CO—, —COO—, —OOC—, —CONR'—, —OCOO—, —OCONR' with the proviso that the spacer group does not contain two adjacent heteroatoms; preferably in which one, two, three or four more $CH_2$, CH or C groups are unreplaced;

$X_1$, $X_2$, $X_3$ and $X_4$ each independently from each other is selected from the group consisting of —O—, —S—, —NR'—, —CO—, —COO—, —OOC—, —CONR'—, —OCOO—, —OCONR' and a single bond; in which R' is selected from the group consisting of hydrogen, a $C_1$-$C_{18}$ alkyl group, preferably a $C_1$-$C_6$alkyl group, more preferably methyl or ethyl;

preferably $X_1$, $X_2$, $X_3$ and $X_4$ each independently from each other is selected from the group consisting of —O—, —CO—, —COO—, —OOC—, —OCOO—, and a single bond, and more preferably $X_1$, $X_2$, $X_3$ and $X_4$ each independently from each other is selected from the group consisting of —O—, —COO—, —OOC—, and a single bond;

$BP_1$ and $BP_2$ each independently from each other represents a polymerizable group; preferably the groups $BP_1$ and $BP_2$ each independently from each other are selected from the group consisting of $CH_2$═C(Ph)-, $CH_2$═CW—COO—, $CH_2$═CH—COO-Ph-, $CH_2$═CW—CO—NH—, $CH_2$═CH—O—, $CH_2$═CH—OOC—, Ph-CH═CH—, $CH_2$═CH-Ph-, $CH_2$═CH-Ph-O—, $R^3$-Ph-CH═CH—COO—, $R^3$—OOC—CH═CH-Ph-O— and 2-W-epoxyethyl, in which W represents hydrogen, chloride, phenyl or a $C_1$-$C_6$alkyl, $R^3$ represents a $C_1$-$C_6$alkyl with the proviso that when $R^3$ is attached to an aryl group it may also represent hydrogen or a $C_1$-$C_6$alkoxy;

especially, the groups $BP_1$ and $BP_2$ each independently from each other are preferably selected from the group consisting of $CH_2$═CW—COO—, $CH_2$═CH—O—, and $CH_2$═CH—OOC—, in which W represents hydrogen, chloride, aryl or a $C_1$-$C_6$alkyl, preferably hydrogen or a $C_1$-$C_6$alkyl, especially methyl or ethyl;

$A_1$, $A_2$, $A_3$ and $A_4$ each independently from each other are selected from the group consisting of hydrogen, —OR, —COOR, —OCOR, —CONR, —OCOOR, —OOONR and a $C_1$-$C_{18}$alkyl group, preferably $C_1$-$C_{12}$ alkyl group, more preferably $C_1$-$C_{10}$ alkyl group, most preferably $C_1$-$C_8$ alkyl group, and especially most preferably $C_1$-$C_6$ alkyl group, and more especially most preferably $C_3$-$C_6$ alkyl group, R is selected from the group consisting of hydrogen, a substituted or unsubstituted, straight-chain or branched $C_{1-18}$ alkyl group, preferably $C_1$-$C_{12}$ alkyl group, more preferably $C_1$-$C_{10}$ alkyl group, most preferably $C_1$-$C_8$ alkyl group, and especially most preferably $C_1$-$C_6$ alkyl group, and more especially most preferably $C_3$-$C_6$ alkyl group; preferably in which one, two, three or four more $CH_2$, CH or C groups are unreplaced or replaced by groups selected from the group consisting of —CH═CH—, —C≡C—, —O—, —S—, —NR'CO—, —COO—, —OOC—, —CONR'—, —OCOO—, —OCONR' with the proviso that the spacer group does not contain two adjacent heteroatoms and preferably R is selected from the group consisting of hydrogen, a substituted or unsubstituted, straight-chain or branched $C_{1-18}$ alkyl group within the above preferences, which one, two, $CH_2$, CH or C groups are unreplaced;

and preferably, $A_3$ and $A_4$ are identical and $A_1$ and $A_2$ are identical or not identical.

More preferred is a compound of formula (I), wherein

A and B each independently from each other represents naphthalene, biphenylene or phenylene, which are unsubstituted or substituted, and especially most preferably A is phenylene and B naphthalene, which are unsubstituted or substituted;

$SP_1$, $SP_2$ and $SP_3$ is identical; or $SP_1$ and $SP_2$ are identical, but different from $SP_3$; wherein $SP_1$, $SP_2$ and $SP_3$ represent a substituted or unsubstituted, straight-chain or branched $C_1$-$C_{10}$ alkylene group, most preferably $C_1$-$C_8$ alkylene group, and especially most preferably $C_1$-$C_6$ alkylene group, and more especially most preferably $C_3$-$C_6$ alkylene group, in which one, two, three or four more $CH_2$, CH or C groups are unreplaced or replaced by groups selected from the group consisting of —CH═CH—, —C≡C—, —O—, —S—, —NR'CO—, —COO—, —OOC—, —CONR'—, —OCOO—, —OCONR' with the proviso that the spacer group does not contain two adjacent heteroatoms; preferably in which one, two, three or four more $CH_2$, CH or C groups are unreplaced;

$X_1$, $X_2$, $X_3$ and $X_4$ are identical; or $X_1$ and $X_2$, are identical, but different $X_3$ and $X_4$; wherein $X_1$, $X_2$, $X_3$ and $X_4$ are selected from the group consisting of —O—, —S—, —NR'—, —CO—, —COO—, —OOC—, —CONR'—, —OCOO—, —OCONR' and a single bond; in which R' is selected from the group consisting of hydrogen, a $C_1$-$C_{16}$ alkyl group, preferably a $C_1$-$C_6$alkyl group, more preferably methyl or ethyl;

preferably $X_1$, $X_2$, $X_3$ and $X_4$ each independently from each other is selected from the group consisting of —O—, —CO—, —COO—, —OOC—, —OCOO—, and a single bond, and more preferably $X_1$, $X_2$, $X_3$ and $X_4$ each independently from each other is selected from the group consisting of —O—, —COO—, —OOC—, and a single bond;

$BP_1$ and $BP_2$ each independently from each other are preferably selected from the group consisting of $CH_2$═CW—COO—, $CH_2$═CH—O—, and $CH_2$═CH—OOC—, in which W represents hydrogen, chloride, aryl or a $C_1$-$C_6$alkyl, preferably hydrogen or a $C_1$-$C_6$alkyl, especially methyl or ethyl;

$A_1$, $A_2$, $A_3$ and $A_4$ each independently from each other are selected from the group consisting of hydrogen, —OR, —COOR, —OCOR, and a $C_1$-$C_{18}$ alkyl group, preferably $C_1$-$C_{12}$ alkyl group, more preferably $C_1$-$C_{10}$ alkyl group, most preferably $C_1$-$C_8$ alkyl group, and especially most preferably $C_1$-$C_6$ alkyl group, and more especially most preferably $C_3$-$C_6$ alkyl group, R is selected from the group consisting of hydrogen, a substituted or unsubstituted, straight-chain or branched $C_1$-$C_{18}$ alkyl group, preferably $C_1$-$C_{12}$ alkyl group, more preferably $C_1$-$C_{10}$ alkyl group, most preferably $C_1$-$C_8$ alkyl group, and especially most preferably $C_1$-$C_6$ alkyl group, and more especially most preferably $C_3$-$C_6$ alkyl group; preferably in which one, two, three or four more $CH_2$, CH or C groups are unreplaced or replaced by groups selected from the group consisting of —CH═CH—, —C≡C—, —O—, —S—, —NR'CO—, —COO—, —OOC—, —CONR'—, —OCOO—, —OCONR' with the proviso that the spacer group does not contain two adjacent heteroatoms and preferably R is selected from the group consisting of hydrogen, a substituted or unsubstituted, straight-chain or branched $C_{1-18}$alkyl group within the above preferences, which one, two, $CH_2$, CH or C groups are unreplaced;

and preferably, $A_3$ and $A_4$ are identical and $A_1$ and $A_2$ are identical or not identical.

In the context of the present invention the wording "carbocyclic or heterocyclic aromatic group" has preferably the meaning of five, six, ten or 14 ring atoms, as for example furan, benzene, pyridine, triazine, pyrimidine, naphthalene, phenanthrene, biphenylene or tetralin units, preferably naphthalene, phenanthrene, biphenylene or phenylene, more preferably naphthalene, biphenylene or phenylene, and most preferably phenylene.

In the context of the present invention the wording "substituted carbocyclic or heterocyclic aromatic group" has the meaning of are for example unsubstituted or mono- or poly-substituted. Preferred substitutents of carbocyclic or heterocyclic aromatic groups are at least one halogen, hydroxyl, a polar group, acryloyloxy, alkylacryloyloxy, alkoxy, alkylcarbonyloxy, alkyloxycarbonyloxy, alkyloxocarbonyloxy, methacryloyloxy, vinyl, vinyloxy and/or allyloxy group, wherein the alkyl residue has preferably from 1 to 20 carbon atoms, and more preferably having from 1 to 10 carbon atoms. Preferred polar groups are nitro, cyano or a carboxy group, and/or a cyclic, straight chain or branched $C_1$-$C_{18}$ alkyl, which is unsubstituted, mono- or poly-substituted. Preferred substitutents of $C_1$-$C_{18}$ alkyl are methyl, fluorine and/or chlorine, wherein one or more, preferably non-adjacent, $CH_2$ group may independently of each other be replaced by a linking group. Preferably, the linking group is selected from —O—, —CO—, —COO— and/or —OCO—.

In the context of the present invention the wording "a monocyclic ring of five or six atoms" has the meaning of for example furan, benzene, preferably phenylene, pyridine, pyrimidine.

A bicyclic ring system of eight, nine or ten atoms is for example naphthalene, biphenylene or tetralin.

A tricyclic ring system of thirteen or fourteen atoms is for example phenanthrene.

The term "phenylene", as used in the context of the present invention, preferably denotes a 1,2-, 1,3- or 1,4-phenylene group, which is optionally substituted. It is preferred that the phenylene group is either a 1,3- or a 1,4-phenylene group. 1,4-phenylene groups are especially preferred.

The term "halogen" denotes a chloro, fluoro, bromo or iodo substituent, preferably a chloro or fluoro substituent.

Alkyl, alkoxy, alkylcarbonyloxy, acryloyloxyalkoxy, acryloyloxyalkyl, acryloyloxyalken, alkyloxycarbonyloxy, alkylacryloyloxy, methacryloyloxyalkoxy, methacryloyloxyalkyl, methacryloyloxyalken, alkylmethacryloyloxy, alkylmethacryloyloxy, alkylvinyl, alkylvinyloxy and alkylallyloxy and alkylene, as used in the context of the present invention denote with their alkyl residue, respectively their alkylene residue, a cyclic, straight-chain or branched, substituted or unsubstituted alkyl, respectively alkylene, in which one or more, preferably non-adjacent, —$CH_2$— group may be replaced by a linking group; wherein the term "linking group", as used in the context of the present invention is preferably be selected from —O—, —CO, —CO—O—, —O—CO—, —N=, —$NR^1$—, —$NR^1$—CO—, —CO—$NR^1$—, —$NR^1$—CO—O—, —O—CO—$NR^1$—, —$NR^1$—CO—$NR^1$—, —CH=CH—, —C≡C—, —O—CO—O—, and —$Si(CH_3)_2$—O—$Si(CH_3)_2$—, and wherein:

$R^1$ represents a hydrogen atom or $C_1$-$C_6$alkyl;

with the proviso that oxygen atoms of linking groups are not directly linked to each other.

Further, the alkyl residue is for example $C_1$-$C_{18}$ alkyl, especially $C_1$-$C_{12}$alkyl, preferably $C_1$-$C_{10}$ alkyl, more preferably $C_1$-$C_8$alkyl, most preferably $C_1$-$C_6$alkyl. Accordingly, allylene is for example $C_1$-$C_{18}$ alkylen, especially $C_1$-$C_{12}$alkylen, preferably $C_1$-$C_{10}$ alkylen, more preferably $C_1$-$C_8$alkylen, most preferably $C_1$-$C_6$alkylen.

In the context of the present invention the definitions for alkyl given below, are applicable to alkylene in analogy.

$C_1$-$C_6$alkyl is for example methyl, ethyl, propyl, isopropyl, butyl, sec.-butyl, tert.-butyl, pentyl or hexyl.

$C_1$-$C_8$alkyl is for example methyl, ethyl, propyl, isopropyl, butyl, sec.-butyl, tert.-butyl, pentyl, hexyl, heptyl, octyl $C_1$-$C_{10}$ alkyl is for example methyl, ethyl, propyl, isopropyl, butyl, sec.-butyl, tert.-butyl, pentyl, hexyl, heptyl, octyl, nonyl, decyl.

$C_1$-$C_{12}$alkyl is for example methyl, ethyl, propyl, isopropyl, butyl, sec.-butyl, tert.-butyl, pentyl, hexyl, heptyl, octyl, nonyl, decyl, undecyl, dodecyl.

$C_1$-$C_{18}$ alkyl is for example methyl, ethyl, propyl, isopropyl, butyl, sec.-butyl, tert.-butyl, pentyl, hexyl, heptyl, octyl, nonyl, decyl, undecyl, dodecyl, tridecyl, tetradecyl, pentadecyl, hexadecyl, heptadecyl, octadecyl.

Substituents of alkyl, alkylene preferably are hydroxy, an ether group, an ester group, a halogene, such as fluorine and/or chlorine.

Preferably, the present invention provides a compound, preferably a liquid crystal, of formula (II)

(II)

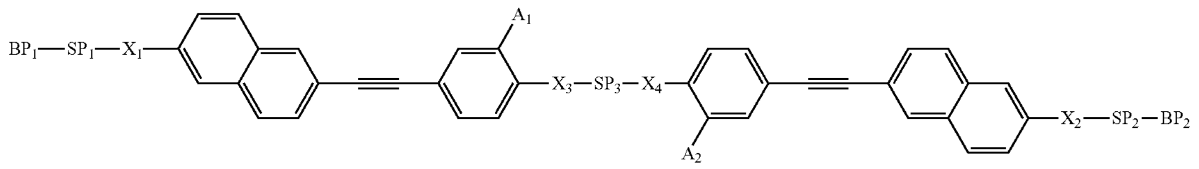

wherein $BP_1$, $BP_2$, $SP_1$, $SP_2$, $SP_3$, $X_1$, $X_2$, $X_3$, $X_4$, $A_1$ and $A_2$ have the same meaning and preferences as given above.

A preferred embodiment of the invention relates to a compound, preferably a liquid crystal, of formula (II), wherein $A_1$ and $A_2$ are identical and preferably selected from the group consisting of —OR, —COOR, —OCOR, and a $C_1$-$C_{18}$ alkyl group, preferably $C_1$-$C_{12}$ alkyl group, more preferably $C_1$-$C_{10}$ alkyl group, most preferably $C_1$-$C_8$ alkyl group, and especially most preferably $C_1$-$C_6$ alkyl group, and more especially most preferably $C_3$-$C_6$ alkyl group, or wherein $A_1$ is selected from the group consisting of hydrogen, —OR, —COOR, —OCOR, and a $C_1$-$C_{18}$ alkyl group, preferably $C_1$-$C_{12}$ alkyl group, more preferably $C_1$-$C_{10}$ alkyl group, most preferably $C_1$-$C_8$ alkyl group, and especially most preferably $C_1$-$C_6$ alkyl group, and more especially most preferably $C_3$-$C_6$ alkyl group, and $A_2$ is hydrogen.

The starting materials are commercially available or may be readily prepared and are well known to a skilled person.

A LCP material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material, for example due to contact with an aligning layer. Polymerization may be initiated by thermal treatment or by exposure to actinic light, which preferably comprises UV-light. The LCP-material may comprise only a single type of liquid crystal compound but may also comprise additional polymerizable and/or non-polymerizable compounds, wherein not all of the compounds have to be liquid crystal compounds. Further, an LCP material may contain additives, including but not limited to antioxidants, initiators, such as photoinitiators, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalysts, sensitizers, stabilizers, such as e.g. phenol derivatives, such as 4-ethoxyphenol or 2,6-di-tert-butyl-4-methylphenol (BHT), lubricating agents; dispersing agents; a polymeric binder and/or monomeric compounds which can be converted into the polymeric binder by polymerization, or, in the case of emulsion coatings and printing inks, a dispersion auxiliary, such as disclosed in U.S. Pat. No. 5,798,147; hydrophobing agents, adhesive agents, flow improvers, defoaming agents, deaerators, diluents, auxiliaries, colorants, dyes and pigments, curing inhibitors, such as hydroquinone, p-tert.-butyl catechol; 2,6-di tert.-butyl-p-methylphenol; phenothiazine; N-phenyl-2-naphthylamine; or a photo-orientable monomer or oligomer or polymer as described in EP 1 090 325 B, a chiral additive, isotropic or anisotropic fluorescent and/or non-fluorescent dyes, in particular dichroic dyes.

It will be appreciated that the compounds of the invention may be used in the preparation of LCP mixtures. Such mixtures may be prepared by admixing a compound of formula (I) with one or more additional components. An organic solvent may also be used in the preparation of these mixtures.

A second aspect of the invention therefore provides a LCP mixture comprising a compound of formula (I) and one or more additional components.

The LCP mixture may also include a suitable organic solvent.

Examples of solvents that may be used in the preparation of such liquid crystalline mixtures include but not limited to, acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), 1,3-dioxolane (DXG), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), propylene glycol monoacetate, propylene glycol diacetate, dipropylene glycol monomethyl ether, dimethyl sulfoxide (DMSO).

Most preferred are cyclopentanone (CP), cyclohexanone (CH), methyl isobutyl ketone (MIBK), methylethylketone (MEK), ethyl acetate (EA), 1-methoxy-2-propanol acetate (MPA), 1,3-dioxolane (DXG), dimethyl sulfoxide (DMSO).

Dichroic dyes refer to dyes in which the absorbance varies between a longer axis direction and a shorter axis direction of a molecule. Dichroic dyes preferably absorb visible light. Examples of dichroic dyes include azo dyes, acridine dyes, oxazine dyes, cyanine dyes, naphthalene dyes and anthraquinone dyes. These dichroic dyes can be used individually or in combination. The amount of dichroic dye used relative to 100 parts by mass of the liquid crystal mixture is 0.01 parts by mass to 40 parts by mass, and preferably 0.05 parts by mass to 15 parts by mass.

The compounds of the invention may also be used in the formation of a LCP layer by casting a LCP compound according to the first aspect of the invention or a LCP mixture according to the second aspect of the invention onto a substrate.

A third aspect of the invention therefore provides a method of forming a LCP network, preferably LCP film, comprising forming a LCP layer comprising a compound of formula (I), or preferably a LCP mixture comprising a compound of formula (I), and polymerising the LCP layer.

The invention also includes, in a fourth aspect of the invention, a cross-linked and/or polymerised LCP network, preferably LCP film, comprising a compound of formula (I), or a LCP mixture, in a cross-linked and/or polymerised form.

The LCP network, preferably LCP film, has preferably a birefringence in the range of 0.28 to 0.45 (±0.01-0.02), more preferably in the range of 0.30 to 0.40 (±0.01), most preferably in the range of 0.31 to 0.40 (±0.01) and especially most preferred in the range of 0.33 to 0.40 (±0.01). The birefringence ($\Delta n$) was obtained by measurement with an Ellipsometer from the determined retardation (here at 550 nm) and thickness values according to the formula ($\Delta n$=Retardation/Thickness). The thicknesses of the samples are measured by a contact stylus profilometer.

A fifth aspect of the invention provides the use of a compound of formula (I) in the preparation of an optical or an electro-optical device.

The use, in the preparation of an optical or electro-optical device, of liquid crystalline mixtures according to the third aspect of the invention is also included in this aspect of the invention.

A sixth aspect of the invention provides an optical or an electro-optical device comprising a compound of formula (I) in a cross-linked state.

An optical or electro-optical device comprising a LCP liquid crystalline mixture in a cross-linked state according to the third aspect of the invention is also included in this aspect of the invention.

The LCP mixture can be applied on a support. The support may be rigid or flexible and can have any form or shape. For example, it may be a body with complex surfaces. In principle it may consist of any material. Preferably, the support comprises plastic, glass or metal or is a silicon wafer. In case the support is flexible, it is preferred that the support is a plastic or metal foil. Preferably, the surface of the support is flat. For some applications the support may comprise topographical surface structures, such as micro-structures like micro lenses or micro-prisms, or structures exhibiting abrupt changes of the shape, such as rectangular structures. Preferably, the support is transparent.

The support may be moving during the deposition of the LCP mixture. For example, a layer of the LCP mixture may be produced in a continuous roll to roll process by depositing the material composition onto a moving flexible foil, which is preferably plastic or metallic. The resulting film may then be wound on a roll together with the support foil or the film may be released from the support and is then wound as a free-standing film, without the support.

The support may have additional layers, such as organic, dielectric or metallic layers. The layers can have different functions, for example an organic layer can be coated as a primer layer which increases compatibility of the materials to be coated with the support. Metallic layers may be used as electrodes, for example when used in electrooptical devices such as displays, or could have the function as a reflector. The support may also be an optical element or device which has certain functions, such as a substrate for an LCD, which might, for example, comprise thin film transistors, electrodes or color filters. In another example, the support is a device comprising an OLED layer structure. The support could also be a retarder film, a polarizer, such as a polarizing film or a sheet polarizer, a reflective polarizer, such as the commercially available Vikuity™ DBEF film.

The LCP mixture may be applied to the support by any suitable method like, extruding, casting, molding, 2D- or 3D-printing or coating. Suitable coating methods are, for example: spin-coating, blade coating, knife coating, kiss roll coating, die coating, dipping, brushing, casting with a bar, roller-coating, flow-coating, wire-coating, spray-coating, dip-coating, curtain-coating, air knife coating, reverse roll coating, gravure coating, metering rod (Meyer bar) coating, slot die (Extrusion) coating, roller coating, flexo coating. Suitable printing methods include: silk screen printing, relief printing such as flexographic printing, jet printing, intaglio printing such as direct gravure printing or offset gravure printing, lithographic printing such as offset printing, or stencil printing such as screen printing.

A layer of a LCP mixture does not have to cover the full surface of a support. Rather than that, the layer may be applied in the form of a pattern, for example by printing, or may after deposition be treated to have the form of a pattern, for example by photo-lithographic methods.

Alignment of the LCP can be achieved by any known means for aligning liquid crystals. For example, the support may have an aligning surface, which shall mean that the surface has the capability to align liquid crystals. The support may already provide the alignment without further treatment. For example, if a plastic substrate is used as a support, it may provide alignment on the surface due to the manufacturing method, for example extrusion or stretching of the substrate. It is also possible to brush the support or imprint a directional microstructure to generate alignment capability. Alternatively, a thin layer of a material may be coated on the support which is especially designed regarding alignment performance. The layer may be further brushed or treated to have a directional microstructure on the surface, for example by imprinting. If the thin layer comprises a photo-orientable substance, alignment can be generated by exposure to aligning light.

The aligning surface of the substrate may exhibit a pattern of alignment directions in order to define an orientation pattern for the liquid crystals in the LCP layer. Preferably, an alignment layer comprising a photo-orientable substance is used for this purpose and the alignment pattern is generated by selective exposure to aligning light of different polarization planes.

In the present invention new compounds of formula I of the present invention have been found which have a high birefringence. Furthermore, the compounds of formula I can be aligned by aligning layers, and preferably with photoalignment materials at low energy, which gives access to less energy consuming and more economic processes.

In addition, it was surprisingly found that the compounds of formula I showed very good alignment quality without any crystallization.

The invention will now be described with reference to the following non-limiting examples. These examples are provided by way of illustration only. Variations on these examples falling within the scope of the invention will be apparent to a skilled person.

EXAMPLES

Definitions Used in the Examples $^1$H NMR: $^1$H nuclear magnetic resonance spectroscopy
DMSO-$d_6$: dimethylsulfoxid deuterated
300 MHz: 300 MegaHertz
m: multiplet, d: doublet, dd: doublet doublet, t: triplet, s: singulet
DMF: dimethylformamide
HCl: hydrochloric acid
$CH_2Cl_2$: dichloromethane
THF: tetrahydrofuran
NMP: N-Methyl-2-pyrrolidon
CuI: Copper iodide
$MgSO_4$: magnesium sulfate In the following examples, the thermotropic phases are abbreviated as follow:

$T_{(Cr—N)}$: transition temperature from crystal phase to nematic phase
$T_{(N—I)}$: transition temperature from nematic phase to isotropic phase

Example 1: Preparation of propyl 5-[2-[6-(3-prop-2-enoyloxypropoxy)-2-naphthyl]ethynyl]-2-[6-[4-[2-[6-(3-prop-2-enoyloxypropoxy)-2-naphthyl]ethynyl]-2-propoxycarbonyl-phenoxy]hexoxy]benzoate, Compound 1

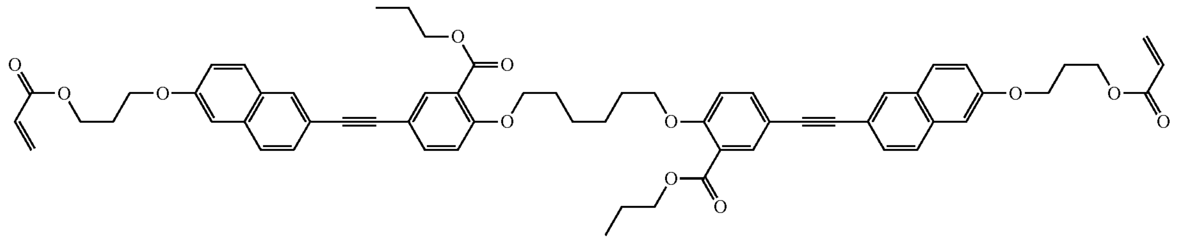 [SMILES: C=CC(=O)OCCCOc1ccc2cc(C#Cc3ccc(OCCCCCCOc4ccc(C#Cc5ccc6cc(OCCCOC(=O)C=C)ccc6c5)cc4C(=O)OCCC)c(C(=O)OCCC)c3)ccc2c1]

Preparation of 3-[(6-ethynyl-2-naphthyl)oxy]propan-1-ol, Compound 2

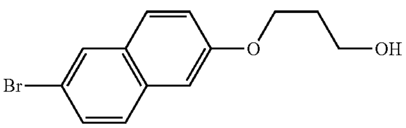 [SMILES: OCCCOc1ccc2cc(Br)ccc2c1]

A mixture of 20 g (85.81 mmol) of 6-bromo-2-naphthol, 15.41 g (111.55 mmol) of potassium carbonate, 1.7 g (10.29 mmol) of potassium iodide and 12.16 g (128.7 mmol) of 3-chloropropanol in 50 ml of NMP is heated at 80° C. for 18 h. The solution is then cooled down and poured into 400 ml of water/HCl solution. The obtained precipitate is filtered off and washed two times with 200 ml of water. The residue was further purified by flash column chromatography over silica gel using a 1:1 mixture of hexane/ethylacetate to give 22.47 g. After recrystallization from heptane/ethylacetate (10:1), 18.6 g of compound 2 was obtained as an off-white solid Preparation of 3-[[6-(2-trimethylsilylethynyl)-2-naphthyl]oxy]propan-1-ol, Compound 3

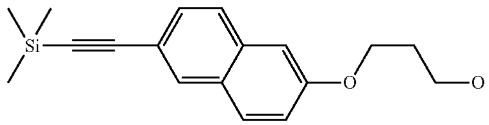 [SMILES: C[Si](C)(C)C#Cc1ccc2cc(OCCCO)ccc2c1]

Bis(Triphenylphosphine)palladium (II) chloride (2.1 g, 2.99 mmol), CuI (799 mg, 4.195 mmol), and compound 2 are placed, in 83.4 ml of triethylamine. The mixture is stirred at 25° C. for 15 minutes, and (trimethylsilyl)acetylene (11.77 g, 119.8 mmol) is added. After stirring the suspension at 80° C. for 2 h, a solution of HCl is dropwise added. The mixture is stirred for 30 min, then filtered off through hyflosilica and washed three times with 100 ml of ethylacetate. The solution is extracted with ethylacetate. The combined organic layers are washed with 5 ml of water and dried with $MgSO_4$. After concentration of the solvent under vacuum, the residue is purified by flash chromatography over silica gel using a 1:1 mixture of hexane/ethylacetate to give 13.41 g of compound 3.

Preparation of 3-[(6-ethynyl-2-naphthyl)oxy]propan-1-ol, Compound 4

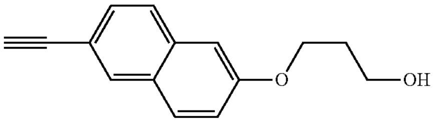 [SMILES: C#Cc1ccc2cc(OCCCO)ccc2c1]

12.4 g (89.79 mmol) of potassium carbonate is added to in several portions to a solution of compound 3 in 135 ml of methanol. After stirring 1 h at room temperature, the reaction mixture is filtered off over Hyflo/silica that is then washed 3 times with 25 ml of methanol. The solution is then poured onto a solution of HCl in water and then extracted with ethylactetate. The combined organic layers are dried over $MgSO_4$. After concentration under vacuum 10.84 g of compound 4 as a yellowish solid is obtained.

Preparation of propyl 5-iodo-2-[6-(4-iodo-2-propoxycarbonyl-phenoxy)hexoxy]benzoate, Compound 5

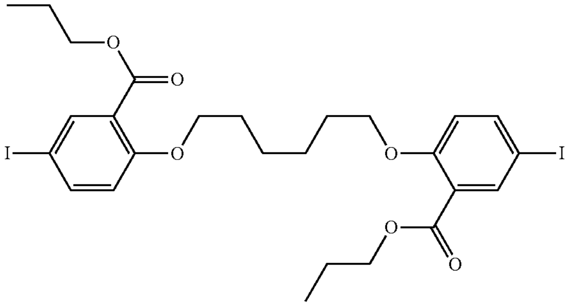 [SMILES: CCCOC(=O)c1cc(I)ccc1OCCCCCCOc1ccc(I)cc1C(=O)OCCC]

A mixture of 9.24 g (30.18 mmol) of propyl 2-hydroxy-5-iodo-benzoate, 5.42 g (39.24 mmol) of potassium carbonate, 601 mg (3.62 mmol) of potassium iodide and 3.68 g (15.09 mmol) of 1,6-dibromobutane in 35 ml of DMF is heated at 80° C. for 5 h. The solution is then cooled down and poured onto 400 ml of water/HCl solution. The obtained precipitate is filtered off and washed two times with 50 ml of water. A purification by recrystallization in acetonitrile give 9.44 g of compound 5 as an off-white solid.

Preparation of propyl 5-[2-[6-(3-hydroxypropoxy)-2-naphthyl]ethynyl]-2-[6-[4-[2-[6-(3-hydroxypropoxy)-2-naphthyl]ethynyl]-2-propoxycarbonyl-phenoxy]hexoxy]benzoate, Compound 6

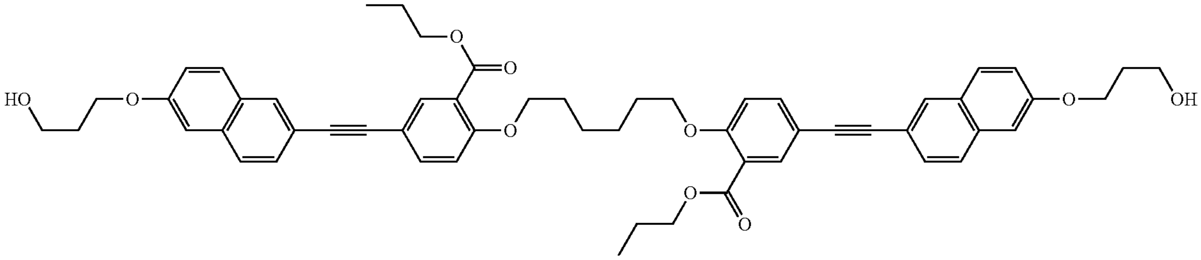 [SMILES: CCCOC(=O)c1cc(C#Cc2ccc3cc(OCCCO)ccc3c2)ccc1OCCCCCCOc1ccc(C#Cc2ccc3cc(OCCCO)ccc3c2)cc1C(=O)OCCC]

Bis(Triphenylphosphine)palladium (II) chloride (202 mg, 0.288 mmol), CuI (109 mg, 0.576 mmol), and propyl 5-iodo-2-[6-(4-iodo-2-propoxycarbonyl-phenoxy)hexoxy]benzoate (4 g, 5.765 mmol), 8.02 ml of triethylamine (57.65 mmol) are placed in 40 ml of DMF. The mixture was stirred at 25° C. for 15 minutes, and 3-[(6-ethynyl-2-naphthyl)oxy]propan-1-ol (2.87 g, 12.68 mmol) is added. After stirring the suspension at room temperature for 8 h, a solution of HCl is added and the mixture is stirred for 30 min. The reaction mixture is then filtered off through Hyflo/silica and washed 3 times with 100 ml of ethylacetate. The solution is extracted with ethylacetate. The combined organic layers are washed with water and dried over $MgSO_4$. After concentration of the solvent under vacuum, the residue is purified by flash chromatography over silica gel using a 1:1 mixture of hexane/ethylacetate to give 4.33 g of compound 6.

Preparation of propyl 5-[2-[6-(3-prop-2-enoyloxypropoxy)-2-naphthyl]ethynyl]-2-[6-[4-[2-[6-(3-prop-2-enoyloxypropoxy)-2-naphthyl]ethynyl]-2-propoxycarbonyl-phenoxy]hexoxy]benzoate, Compound 1

To 4.33 g (4.859 mmol) of compound 6 in 45 mL of THF and 2.65 g (26.24 mmol) of triethylamine is added 4-dimethyl aminopyridine (118.7 mg, 0.97 mmol). This solution is cooled down to 0° C. and acryloyldichloride (2.2 g, 24.29 mmol) is added dropwise. The solution is then warmed to room temperature and let it stir for 18 hours. The residue is purified by flash chromatography over silica gel using a 1:1 mixture of hexane/ethylacetate to give 1.2 g of an off-white solid compound 1.

$^1$H NMR (400 MHz, DMSO-d6) δ: 8.08 (s, 2H), 7.82 (m, 6H), 7.80 (dd, 2H), 7.55 (dd, 2H), 7.37 (d, 2H), 7.19 (m, 4H), 6.35 (dd, 2H), 6.19 (m, 2H), 5.95 (dd, 2H), 4.32 (t, 4H), 4.20 (q, 8H), 4.10 (t, 4H), 2.16 (qt, 4H), 1.70 (m, 8H), 1.52 (m, 4H), 0.96 (t, 6H).

Liquid crystal phase Transition: Compound 1 was observed with a polarizing microscope under cross polarizers to determine its phase transition temperature. As a result, when the temperature increased, the crystalline phase changed into a nematic phase at 105.8° C. ($T_{(Cr-N)}$) and the isotropic phase appeared to be at 125.7° C. ($T_{(N-I)}$).

Example 2: Preparation of propyl 5-[2-[6-(6-prop-2-enoyloxyhexoxy)-2-naphthyl]ethynyl]-2-[6-[4-[2-[6-(6-prop-2-enoyloxyhexoxy)-2-naphthyl]ethynyl]phenoxy]hexoxy]benzoate, Compound 7

Preparation of 6-[(6-bromo-2-naphthyl)oxy]hexan-1-ol, Compound 8a

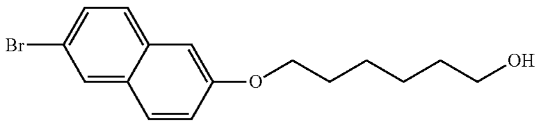 [SMILES: OCCCCCCOc1ccc2cc(Br)ccc2c1]

The compound 8a is prepared according to the process described in example 1 for compound 2 with the proviso that 3-chloropropanol is replaced by 3-bromohexanol.

Preparation of 6-[[6-(2-trimethylsilylethynyl)-2-naphthyl]oxy]hexan-1-ol, Compound 8b

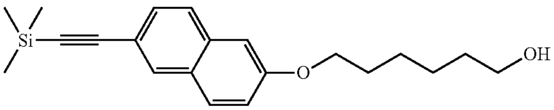 [SMILES: C[Si](C)(C)C#Cc1ccc2cc(OCCCCCCO)ccc2c1]

The compound 8b is prepared according to the process described in example 1 for compound 3 with the proviso that compound 2 is replaced by compound 8a.

Preparation of 6-[(6-ethynyl-2-naphthyl)oxy]hexan-1-ol, Compound 9

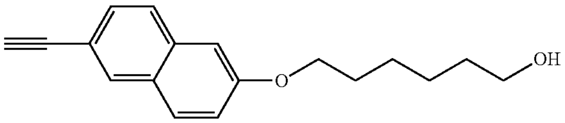 [SMILES: C#Cc1ccc2cc(OCCCCCCO)ccc2c1]

The compound 9 is prepared according to the process described in example 1 for compound 4 with the proviso that compound 3 is replaced by compound 8b.

Preparation of 1-(6-chlorohexoxy)-4-iodo-benzene, Compound 10

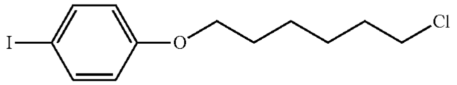 [SMILES: ClCCCCCCOc1ccc(I)cc1]

To a solution of 4-iodophenol (25 g, 113.6 mmol) in 250 ml of THF, 6-chlorohexanol (19.4 g, 142 mmol) and triphenylphospine (37.25 g, 142 mmol) are added. The mixture is cooled down to 0° C. and diisopropyl azodicarboxylate (28.72 g, 142 mmol) in 250 ml of THF is added dropwise. After the addition, the reaction is cooled down to room temperature and stirred for 18 h. The solution is then concentrated under vacuum and the residue is purified by

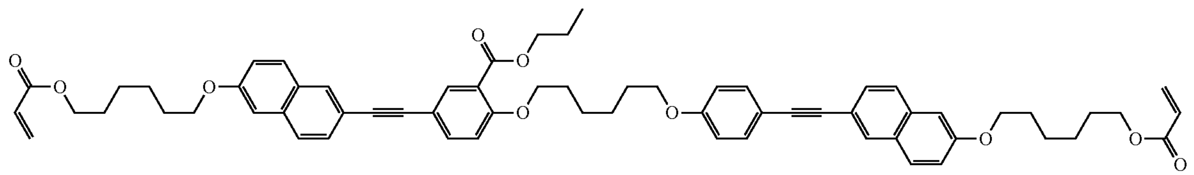

flash chromatography over silica gel using a 1:4 mixture of hexane/ethylacetate to give 35.4 g of an off-white solid compound 10.

Preparation of propyl 5-iodo-2-[6-(4-iodophenoxy) hexoxy]benzoate, Compound 11

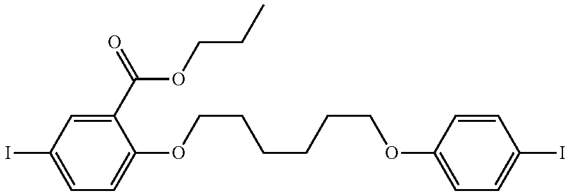 [SMILES: CCCOC(=O)c1cc(I)ccc1OCCCCCCOc1ccc(I)cc1]

To a mixture of 12.05 g (39.37 mmol) of propyl 2-hydroxy-5-iodo-benzoate, 7.07 g (51.18 mmol) of potassium carbonate, 784 mg (4.73 mmol) of potassium iodide and in 40 ml of DMF is added dropwise 20 g (50.06 mmol) of 1-(6-chlorohexoxy)-4-iodo-benzene in 50 ml of DMF. After heating at 80° C. for 18 h, the solution is then cooled down and poured into 400 mL of water/HCl solution. The obtained precipitate is filtered off and purified by flash chromatography over silica gel using a 9:1 mixture of hexane/ethylacetate to give 23.3 g of a yellowish solid compound 11.

Preparation propyl 5-[2-[6-(6-hydroxyhexoxy)-2-naphthyl]ethynyl]-2-[6-[4-[2-[6-(6-hydroxyhexoxy)-2-naphthyl]ethynyl]phenoxy]hexoxy]benzoate, Compound 12

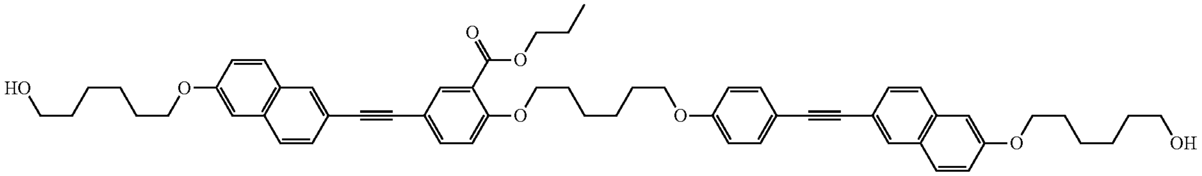 [SMILES: CCCOC(=O)c1cc(C#Cc2ccc3cc(OCCCCCCO)ccc3c2)ccc1OCCCCCCOc1ccc(C#Cc2ccc3cc(OCCCCCCO)ccc3c2)cc1]

The compound 12 is prepared according to the process described in example 1 for compound 6 with the proviso that compound 5 is replaced by compound 11.

Preparation of propyl 5-[2-[6-(6-prop-2-enoyloxyhexoxy)-2-naphthyl]ethynyl]-2-[6-[4-[2-[6-(6-prop-2-enoyloxyhexoxy)-2-naphthyl]ethynyl]phenoxy] hexoxy]benzoate, Compound 7

The compound 7 is prepared according to the process described in example 1 for compound 1 with the proviso that compound 6 is replaced by the compound 12.

$^1$H NMR (400 MHz, THF-d8) δ: 7.91 (dd, 3H), 7.70 (m, 4H), 7.60 (dd, 1H), 7.55-7.40 (m, 4H), 7.20 (m, 1H), 7.16-7.08 (m, 4H), 6.91 (d, 1H), 6.33 (dd, 2H), 6.11 (dd, 2H), 5.77 (dd, 2H), 4.22 (t, 2H), 4.11 (m, 10H), 4.02 (t, 2H), 1.9-1.4 (m, 26H), 1.03 (t, 3H).

Liquid crystal phase transition: $T_{(Cr—N)}$: 83.3° C., $T_{(N—I)}$ 146.3° C.

Example 3: Preparation of methyl 2-[6-[2-methoxycarbonyl-4-[2-[6-(11-prop-2-enoyloxyundecoxy)-2-naphthyl]ethynyl]phenoxy]hexoxy]-5-[2-[6-(11-prop-2-enoyloxyundecoxy)-2-naphthyl]ethynyl] benzoate, Compound 14

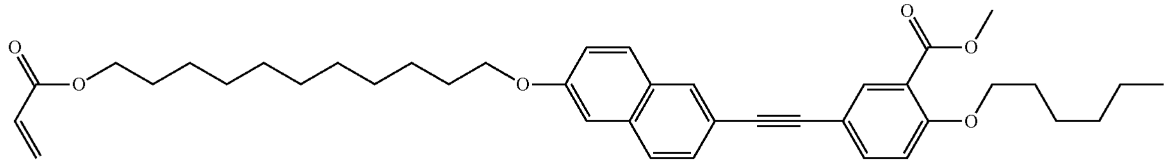

-continued

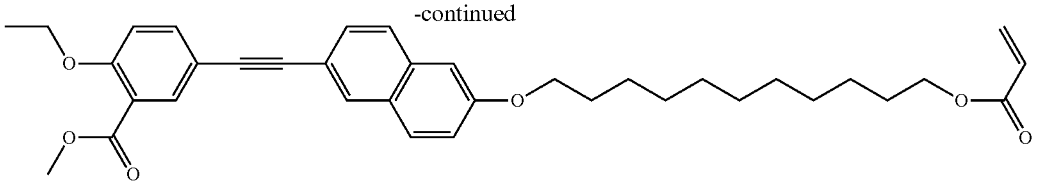

Preparation of 11-[(6-bromo-2-naphthyl)oxy]undecan-1-ol, Compound 15

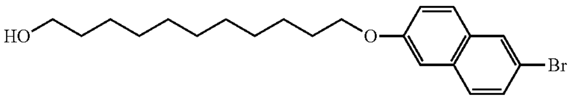 [SMILES: OCCCCCCCCCCCOc1ccc2cc(Br)ccc2c1]

The compound 15 is prepared according to the process described in example 1 for compound 2 with the proviso that 3-chloropropanol is replaced by 11-bromoundecanol.

Preparation of 11-[[6-(2-trimethylsilylethynyl)-2-naphthyl]oxy]undecan-1-ol, Compound 16

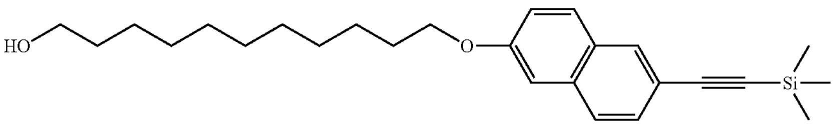 [SMILES: C[Si](C)(C)C#Cc1ccc2cc(OCCCCCCCCCCCO)ccc2c1]

The compound 16 is prepared according to the process described in example 1 for compound 3 with the proviso that compound 2 is replaced by compound 15.

Preparation of 11-[(6-ethynyl-2-naphthyl)oxy]undecan-1-ol, Compound 17

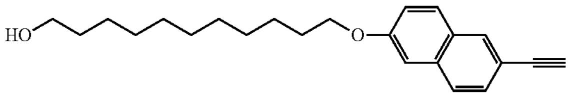 [SMILES: C#Cc1ccc2cc(OCCCCCCCCCCCO)ccc2c1]

The compound 17 is prepared according to the process described in example 1 for compound 4 with the proviso that compound 3 is replaced by compound 16.

Preparation of methyl 5-iodo-2-[6-(4-iodo-2-methoxycarbonyl-phenoxy)hexoxy]benzoate, Compound 18

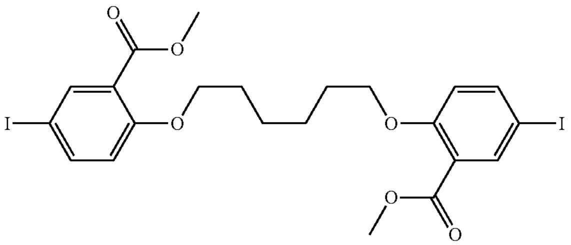 [SMILES: COC(=O)c1cc(I)ccc1OCCCCCCOc1ccc(I)cc1C(=O)OC]

The compound 18 is prepared according to the process described in example 1 for compound 5 with the proviso that propyl 2-hydroxy-5-iodo-benzoate is replaced by methyl 2-hydroxy-5-iodo-benzoate.

Preparation of methyl 5-[2-[6-(11-hydroxyundecoxy)-2-naphthyl]ethynyl]-2-[6-[4-[2-[6-(11-hydroxyundecoxy)-2-naphthyl]ethynyl]-2-methoxycarbonyl-phenoxy]hexoxy]benzoate, Compound 19

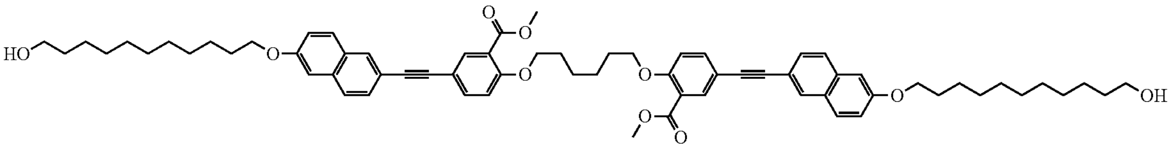 [SMILES: COC(=O)c1cc(C#Cc2ccc3cc(OCCCCCCCCCCCO)ccc3c2)ccc1OCCCCCCOc1ccc(C#Cc2ccc3cc(OCCCCCCCCCCCO)ccc3c2)cc1C(=O)OC]

The compound 19 is prepared according to the process described in example 1 for compound 6 with the proviso that compound 5 is replaced by compound 18.

Preparation of methyl 2-[6-[2-methoxycarbonyl-4-[2-[6-(11-prop-2-enoyloxyundecoxy)-2-naphthyl]ethynyl]phenoxy]hexoxy]-5-[2-[6-(11-prop-2-enoyloxyundecoxy)-2-naphthyl]ethynyl]benzoate, Compound 14

The compound 14 is prepared according to the process described in example 1 for compound 1 with the proviso that compound 6 is replaced by compound 19.

$^1H$ NMR (400 MHz, THF-d8) δ: 7.94 (d, 2H), 7.90 (d, 2H), 7.70 (dd, 4H), 7.60 (dd, 2H), 7.47 (dd, 2H), 7.13 (m, 6H), 6.32 (dd, 2H), 6.10 (dd, 2H), 5.78 (dd, 2H), 4.10 (m, 12H), 3.82 (s, 6H), 1.9-1.75 (m, 8H), 1.75-1.35 (m, 18H).

Liquid crystal phase transition: $T_{(Cr-N)}$: 110.6° C., $T_{(N-I)}$: 120.8° C.

Example 4: Preparation of propyl 5-[2-[6-(5-prop-2-enoyloxypentoxy)-2-naphthyl]ethynyl]-2-[6-[4-[2-[6-(5-prop-2-enoyloxypentoxy)-2-naphthyl]ethynyl]-2-propoxycarbonyl-phenoxy]hexoxy]benzoate, Compound 20

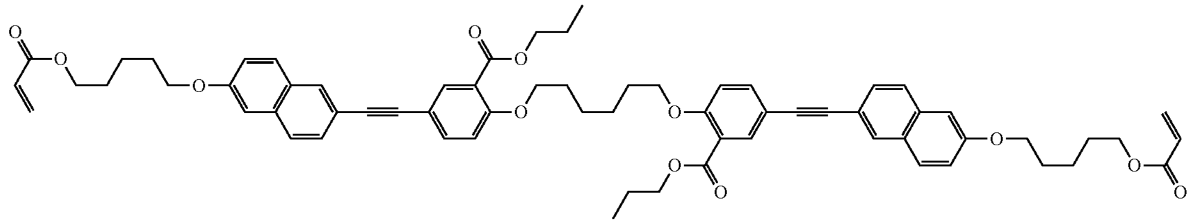 [SMILES: C=CC(=O)OCCCCCOc1ccc2cc(C#Cc3ccc(OCCCCCCOc4ccc(C#Cc5ccc6cc(OCCCCCOC(=O)C=C)ccc6c5)cc4C(=O)OCCC)c(C(=O)OCCC)c3)ccc2c1]

Preparation of 5-[(6-bromo-2-naphthyl)oxy]pentan-1-ol, Compound 21

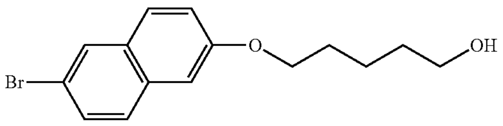 [SMILES: OCCCCCOc1ccc2cc(Br)ccc2c1]

The compound 21 is prepared according to the process described in example 1 for compound 2 with the proviso that 3-chloropropanol is replaced by 5-bromopentanol.

Preparation of 5-[[6-(2-trimethylsilylethynyl)-2-naphthyl]oxy]pentan-1-ol, Compound 22

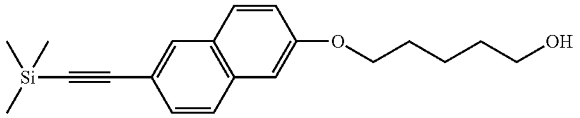 [SMILES: C[Si](C)(C)C#Cc1ccc2cc(OCCCCCO)ccc2c1]

The compound 22 is prepared according to the process described in example 1 for compound 3 with the proviso that compound 2 is replaced by compound 21.

Preparation of 5-[(6-ethynyl-2-naphthyl)oxy]pentan-1-ol, Compound 23

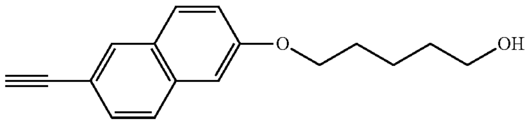 [SMILES: C#Cc1ccc2cc(OCCCCCO)ccc2c1]

The compound 23 is prepared according to the process described in example 1 for compound 4 with the proviso that compound 3 is replaced by compound 22.

Preparation of propyl 5-[2-[6-(5-hydroxypentoxy)-2-naphthyl]ethynyl]-2-[6-[4-[2-[6-(5-hydroxypentoxy)-2-naphthyl]ethynyl]-2-propoxycarbonyl-phenoxy]hexoxy]benzoate, Compound 24

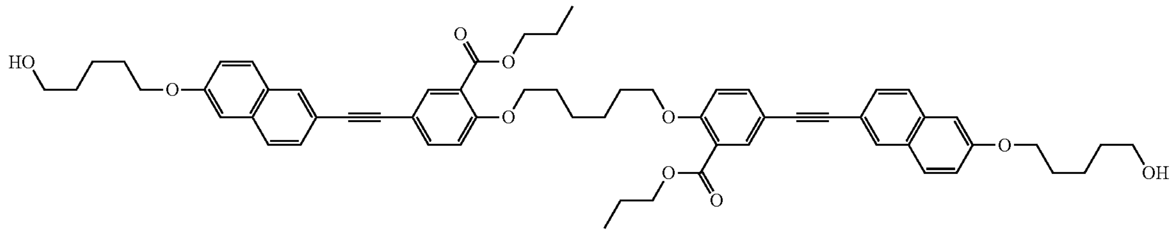 [SMILES: CCCOC(=O)c1cc(C#Cc2ccc3cc(OCCCCCO)ccc3c2)ccc1OCCCCCCOc1ccc(C#Cc2ccc3cc(OCCCCCO)ccc3c2)cc1C(=O)OCCC]

The compound 24 is prepared according to the process described in example 1 for compound 6 with the proviso that compound 4 is replaced by compound 23.

Preparation of propyl 5-[2-[6-(5-prop-2-enoyloxy-pentoxy)-2-naphthyl]ethynyl]-2-[6-[4-[2-[6-(5-prop-2-enoyloxypentoxy)-2-naphthyl]ethynyl]-2-propoxy-carbonyl-phenoxy]hexoxy]benzoate, Compound 20

The compound 20 is prepared according to the process described in example 1 for compound 1 with the proviso that compound 6 is replaced by compound 24.

$^1$H NMR (400 MHz, DMSO-d6) δ: 8.07 (s, 2H), 7.80 (m, 6H), 7.71 (dd, 2H), 7.53 (dd, 2H), 7.34 (d, 2H), 7.20 (m, 4H), 6.32 (dd, 2H), 6.18 (m, 2H), 5.93 (dd, 2H), 4.14 (m, 16H), 1.73 (m, 16H), 1.52 (m, 8H), 0.96 (t, 6H) Liquid crystal phase transition: $T_{(Cr—N)}$: 123° C., $T_{(N—I)}$ 126.9° C.

Example 5: Preparation propyl 5-[2-[6-(6-prop-2-enoyloxyhexoxy)-2-naphthyl]ethynyl]-2-[6-[4-[2-[5-(6-prop-2-enoyloxyhexoxy)-2-naphthyl]ethynyl]-2-propoxycarbonyl-phenoxy]hexoxy]benzoate, Compound 25

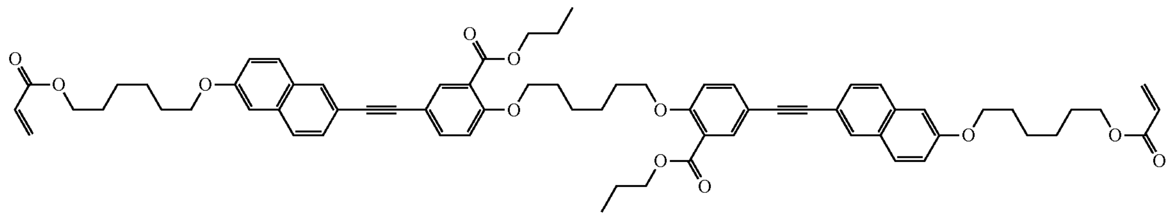 [SMILES: C=CC(=O)OCCCCCCOc1ccc2cc(C#Cc3ccc(OCCCCCCOc4ccc(C#Cc5ccc6cc(OCCCCCCOC(=O)C=C)ccc6c5)cc4C(=O)OCCC)c(C(=O)OCCC)c3)ccc2c1]

Preparation of propyl 5-[2-[6-(6-hydroxyhexoxy)-2-naphthyl]ethynyl]-2-[6-[4-[2-[6-(6-hydroxyhexoxy)-2-naphthyl]ethynyl]-2-propoxycarbonyl-phenoxy] hexoxy]benzoate, Compound 26

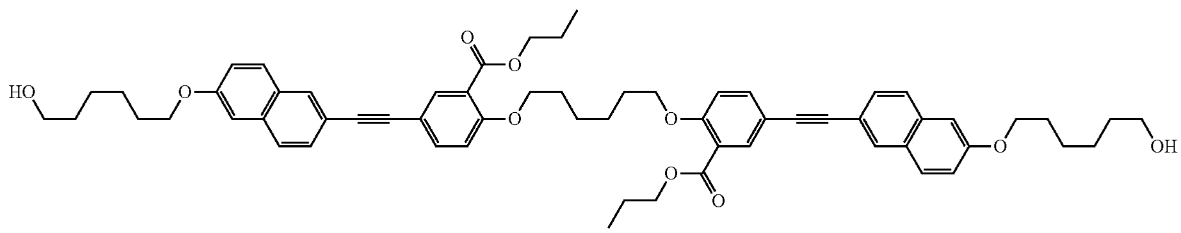 [SMILES: CCCOC(=O)c1cc(C#Cc2ccc3cc(OCCCCCCO)ccc3c2)ccc1OCCCCCCOc1ccc(C#Cc2ccc3cc(OCCCCCCO)ccc3c2)cc1C(=O)OCCC]

The compound 26 is prepared according to the process described in example 1 for compound 6 with the proviso that compound 4 is replaced by compound 9.

Preparation propyl 5-[2-[6-(6-prop-2-enoyloxy-hexoxy)-2-naphthyl]ethynyl]-2-[6-[4-[2-[5-(6-prop-2-enoyloxyhexoxy)-2-naphthyl]ethynyl]-2-propoxy-carbonyl-phenoxy]hexoxy]benzoate, Compound 25

The compound 25 is prepared according to the process described in example 1 for compound 1 with the proviso that compound 6 is replaced by compound 26.

$^1$H NMR (400 MHz, DMSO-d6) δ: 8.07 (s, 2H), 7.80 (m, 6H), 7.71 (dd, 2H), 7.53 (dd, 2H), 7.34 (d, 2H), 7.20 (m, 4H), 6.32 (dd, 2H), 6.18 (m, 2H), 5.93 (dd, 2H), 4.13 (m, 16H), 1.73 (m, 16H), 1.50 (m, 12H), 0.96 (t, 6H) Liquid crystal phase transition: $T_{(Cr—N)}$: 103.5° C., $T_{(N—I)}$: 117° C.

Example 6: Preparation of propyl 5-[2-[6-(6-prop-2-enoyloxyhexoxy)-2-naphthyl]ethynyl]-2-[4-[4-[2-[6-(6-prop-2-enoyloxyhexoxy)-2-naphthyl]ethynyl]phenoxy]butoxy]benzoate, Compound 30

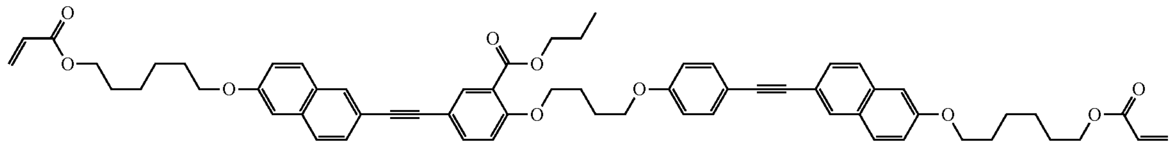 [SMILES: C=CC(=O)OCCCCCCOc1ccc2cc(C#Cc3ccc(OCCCCOc4ccc(C#Cc5ccc6cc(OCCCCCCOC(=O)C=C)ccc6c5)cc4C(=O)OCCC)cc3)ccc2c1]

Preparation of propyl 5-iodo-2-[4-(4-iodophenoxy)butoxy]benzoate, Compound 31

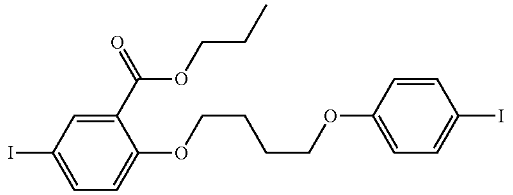 [SMILES: CCCOC(=O)c1cc(I)ccc1OCCCCOc1ccc(I)cc1]

The compound 31 is prepared according to the process described in example 2 for compound 11 with the proviso that 1-(6-chlorohexoxy)-4-iodo-benzene is replaced by 1-(6-chlorobutoxy)-4-iodo-benzene.

Preparation of propyl 5-[2-[6-(6-hydroxyhexoxy)-2-naphthyl]ethynyl]-2-[4-[4-[2-[6-(6-hydroxyhexoxy)-2-naphthyl]ethynyl]phenoxy]butoxy]benzoate, Compound 32

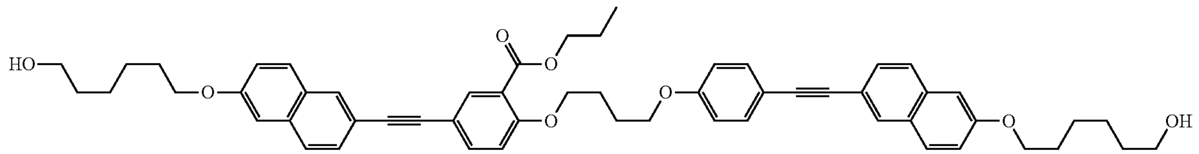 [SMILES: CCCOC(=O)c1cc(C#Cc2ccc3cc(OCCCCCCO)ccc3c2)ccc1OCCCCOc1ccc(C#Cc2ccc3cc(OCCCCCCO)ccc3c2)cc1]

The compound 32 is prepared according to the process described in example 2 for compound 12 with the proviso that compound 11 is replaced by compound 31.

Preparation of propyl 5-[2-[6-(6-prop-2-enoyloxyhexoxy)-2-naphthyl]ethynyl]-2-[4-[4-[2-[6-(6-prop-2-enoyloxyhexoxy)-2-naphthyl]ethynyl]phenoxy]butoxy]benzoate, Compound 30

The compound 30 is prepared according to the process described in example 1 for compound 1 with the proviso that compound 6 is replaced by compound 31.

$^1$H NMR (400 MHz, DMSO-d6) δ: 8.05 (s, 2H), 7.82 (m, 4H), 7.72 (dd, 2H), 7.52 (m, 4H), 7.34 (s, 2H), 7.21 (m, 3H), 7.00 (d, 2H), 6.32 (dd, 2H), 6.17 (m, 2H), 5.92 (dd, 2H), 4.14 (m, 14H), 1.92 (m, 4H), 1.79-1.60 (m, 10H), 1.44 (m, 5H), 0.96 (t, 6H) Liquid crystal phase transition: $T_{(Cr—N)}$: 85.1° C., $T_{(N—I)}$: 158.3° C.-

Example 7: Preparation of ethyl 2-[6-[2-ethoxycarbonyl-4-[2-[6-(3-prop-2-enoyloxypropoxy)-2-naphthyl]ethynyl]phenoxy]hexoxy]-5-[2-[6-(3-prop-2-enoyloxypropoxy)-2-naphthyl]ethynyl]benzoate, Compound 33

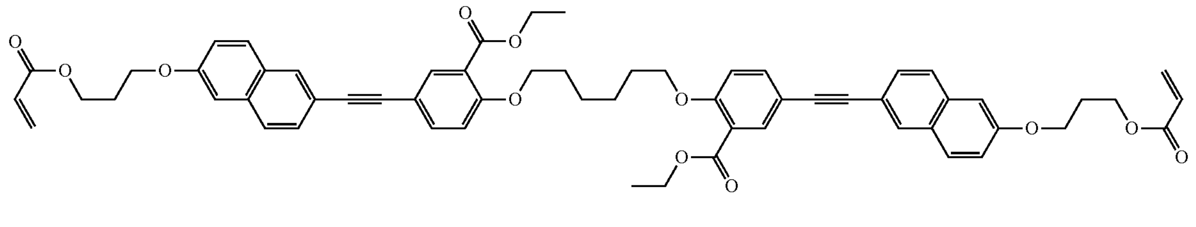 [SMILES: C=CC(=O)OCCCOc1ccc2cc(C#Cc3ccc(OCCCCCCOc4ccc(C#Cc5ccc6cc(OCCCOC(=O)C=C)ccc6c5)cc4C(=O)OCC)c(C(=O)OCC)c3)ccc2c1]

Preparation of ethyl 2-[6-(2-ethoxycarbonyl-4-iodo-phenoxy)hexoxy]-5-iodo-benzoate, Compound 34

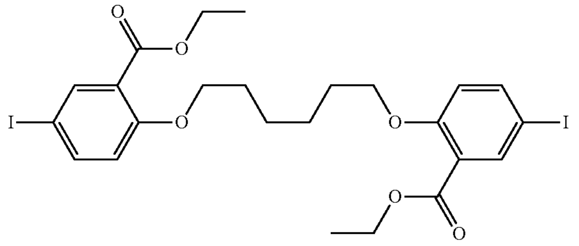 [SMILES: CCOC(=O)c1cc(I)ccc1OCCCCCCOc1ccc(I)cc1C(=O)OCC]

The compound 34 is prepared according to the process described in example 1 for compound 5 with the proviso that propyl 2-hydroxy-5-iodo-benzoate is replaced by ethyl 2-hydroxy-5-iodo-benzoate.

Preparation of ethyl 2-[6-[2-ethoxycarbonyl-4-[2-[6-(3-hydroxypropoxy)-2-naphthyl]ethynyl]phenoxy]hexoxy]-5-[2-[6-(3-hydroxypropoxy)-2-naphthyl]ethynyl]benzoate, Compound 35

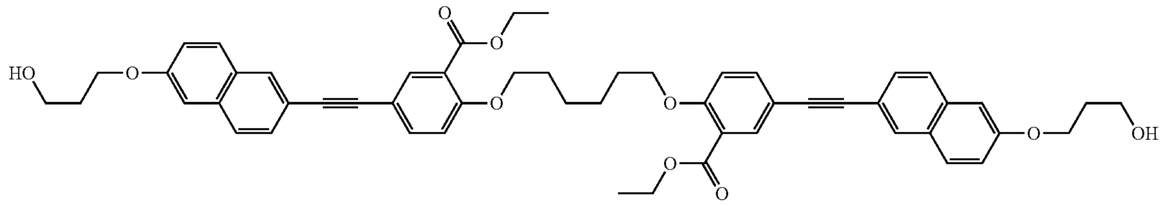 [SMILES: CCOC(=O)c1cc(C#Cc2ccc3cc(OCCCO)ccc3c2)ccc1OCCCCCCOc1ccc(C#Cc2ccc3cc(OCCCO)ccc3c2)cc1C(=O)OCC]

The compound 35 is prepared according to the process described in example 1 for compound 6 with the proviso that compound 5 is replaced by compound 34.

Preparation of ethyl 2-[6-[2-ethoxycarbonyl-4-[2-[6-(3-prop-2-enoyloxypropoxy)-2-naphthyl]ethynyl]phenoxy]hexoxy]-5-[2-[6-(3-prop-2-enoyloxypropoxy)-2-naphthyl]ethynyl]benzoate Compound 33

The compound 33 is prepared according to the process described in example 1 for compound 1 with the proviso that compound 6 is replaced by compound 35.

$^1$H NMR (400 MHz, DMSO-d6) δ: 8.07 (s, 2H), 7.82 (m, 6H), 7.70 (dd, 2H), 7.54 (dd, 2H), 7.37 (d, 2H), 7.20 (m, 4H), 6.36 (dd, 2H), 6.19 (m, 2H), 5.95 (dd, 2H), 4.25 (m, 12H), 4.09 (t, 4H), 2.16 (qt, 4H), 1.76 (m, 4H), 1.53 (m, 4H), 1.30 (t, 6H) Liquid crystal phase transition: $T_{(Cr—N)}$: 123.5° C., $T_{(N—I)}$: 143° C.

Example 8: Preparation of an Orientation Layer Using Photoalignment Materials

A glass substrate is spin-coated with a Photoalignment Composition (3% solid content of a photoaligning material in cyclopentanone as described in patent publication WO2012/085048: photoactive polymer materials use as orienting layer for liquid crystals).

The film is dried at 180° C. for 10 min and the resulting film thickness is about 100 nm. Then, the film is exposed to aligning light, which is collimated and linearly polarized UV (LPUV) light (280-320 nm) with 250 mJ/cm$^2$. The plane of polarization is 0° with regard to a reference edge on the substrate.

Example 9: Preparation of Compound 1 Film

A 14.0 w % solution is prepared by mixing the 13.552 w % compound 1, 0.140 w % of 2,6-di-tert-butyl-4-methylphenol, 0.280 w % of Irgacure® 369, (Irgacure® 369, having the chemical structure of 2-Benzyl-2-dimethylamino-1-(4-morpholinophenyl)-butanone-1), 0.028 w % of BYK® 378 (solvent-free silicone levelling agent) in cyclopentanone and stirred thoroughly till the solid is completely dissolved at room temperature. The above polymer solution was spin-coated onto a glass plate with the orientation layer of Example 8 to form a liquid crystal film.

This film is dried at 108° C. for 1 min 30 onto a temperature controlled hot plate. The sample is cooled down to room temperature and then photo-polymerised by irradiation with UV light using a Mercury lamp for approximately 2 min at room temperature, 20-25° C. under $N_2$ atmosphere to fix the orientation state of the liquid crystal.

The resulting film of example 9 exhibited a very well oriented nematic mesophase at room temperature.

Example 10: Preparation of Compound 25 Film

A 15.0 w % solution is prepared by mixing the 14.775 w % compound 25, 0.075 w % of 2,6-di-tert-butyl-4-methylphenol, 0.150 w % of Irgacure® 369 in cyclohexanone and stirred thoroughly till the solid is completely dissolved at room temperature. The above polymer solution was spin-coated onto a glass plate with the orientation layer of Example 8 to form a liquid crystal film. This film is dried at 110° C. for 5 min onto a temperature controlled hot plate. The sample is cooled down to room temperature, 20-25° C. and then photo-polymerised by irradiation with UV light using a Mercury lamp for approximately 2 min at room temperature under $N_2$ atmosphere to fix the orientation state of the liquid crystal.

The resulting film of example 10 exhibited a very well oriented nematic mesophase at room temperature.

Example 11: Preparation of Compound 4 Film

A 7.5 w % solution is prepared by mixing the 7.3875 w % compound 4, 0.0375 w % of 2,6-di-tert-butyl-4-methylphenol, 0.075 w % of Irgacure® 369 in cyclohexanone and stirred thoroughly till the solid is completely dissolved at room temperature. The above polymer solution was spin-coated onto a glass plate with the orientation layer of Example 8 to form a liquid crystal film. This film is dried at 120° C. for 5 min onto a temperature controlled hot plate. The sample is cooled down to room temperature and then photo-polymerised by irradiation with UV light using a Mercury lamp for approximately 2 min at room temperature under $N_2$ atmosphere to fix the orientation state of the liquid crystal.

The resulting film of example 11 exhibited an oriented nematic mesophase with a medium quality of alignment at room temperature.

Example 12: Preparation of Compound 7 Film

A 15 w % solution is prepared by mixing the 14.370 w % compound 7, 0.300 w % of 2,6-di-tert-butyl-4-methylphenol, 0.300 w % of Irgacure® 369 in cyclopentanone/3-dioxolane 60/40 and stirred thoroughly till the solid is completely dissolved at room temperature. The above polymer solution was spin-coated onto a glass plate with the orientation layer of Example 8 to form a liquid crystal film. This film is dried at 130° C. for 5 min onto a temperature controlled hot plate. The sample is cooled down to room temperature and then photo-polymerised by irradiation with UV light using a Mercury lamp for approximately 2 min at room temperature, 20-25° C. under $N_2$ atmosphere to fix the orientation state of the liquid crystal.

The resulting film of example 12 exhibited a very well oriented nematic mesophase at room temperature.

Example 13: Preparation of Compound 20 Film

A 15 w % solution is prepared by mixing the 14.520 w % compound 20, 0.150 w % of 2,6-di-tert-butyl-4-methylphenol, 0.300 w % of Irgacure® 369 and 0.030 wt % of BYK @ 378 in cyclopentanone and stirred thoroughly till the solid is completely dissolved at room temperature. The above polymer solution was spin-coated onto a glass plate with the orientation layer of Example 8 to form a liquid crystal film. This film is dried at 108° C. for 1 min 30 onto a temperature controlled hot plate. The sample is cooled down to room temperature and then photo-polymerised by irradiation with UV light using a Mercury lamp for approximately 2 min at room temperature, 20-25° C. under $N_2$ atmosphere to fix the orientation state of the liquid crystal.

The resulting film of example 13 exhibited a very well oriented nematic mesophase at room temperature.

Example 14: Preparation of Compound 30 Film

A 15 w % solution is prepared by mixing the 14.520 w % compound 30, 0.150 w % of 2,6-di-tert-butyl-4-methylphenol, 0.300 w % of Irgacure® 369 and 0.030 wt % of Tego Flow 0.300 in cyclopentanone and stirred thoroughly till the solid is completely dissolved at room temperature. The above polymer solution was spin-coated onto a glass plate with the orientation layer of Example 8 to form a liquid crystal film. This film is dried at 148° C. for 5 min onto a temperature controlled hot plate. The sample is cooled down to room temperature and then photo-polymerised by irradiation with UV light using a Mercury lamp for approximately 2 min at room temperature, 20-25° C. under $N_2$ atmosphere to fix the orientation state of the liquid crystal.

The resulting film of example 14 exhibited a very well oriented nematic mesophase at room temperature.

Example 15

The retardation at 550 nm of the sample described in example 9, example 10, example 11, example 12, example 14 are measured with an Ellipsometer. The thicknesses of the samples are measured by a contact stylus profilometer. The birefringence (Δn) was obtained from the determined retardation and thickness values according to the formula (Δn=Retardation/Thickness). The values are listed in Table 1.

TABLE 1

| Example | Thickness (nm) | Retardation at 550 nm | Δn |
|---|---|---|---|
| 9 (compound 1) | 1170 ± 30 | 450.9 | 0.39 ± 0.01 |
| 10 (compound 25) | 780 ± 30 | 238.7 | 0.31 ± 0.01 |
| 11 (compound 14) | 220 ± 20 | 70.8 | 0.32 ± 0.02 |
| 12 (compound 7) | 1320 ± 30 | 472.5 | 0.36 ± 0.01 |
| 14 (compound 30) | 1050 ± 30 | 362.1 | 0.35 ± 0.01 |

The films of Example 9, 10, 11, 12, 14 have high birefringence in the range from 0.31 to 0.39. These new LCPs could be used for preparing phase retarder optical films as Quarter-Waveplate (QWP) and Half-Waveplate (HWP). A retarder transmits light and modifies its polarization state and is widely used in various display application or in security elements.

The particularly high birefringence of these new LCPs leads to a significant thickness reduction of the retarder's films.

As an example, Table 2 shows the required thickness to get a quarter waveplate (14) retarder (QWP) and Half-Waveplate (12) retarder (HWP) at 550 nm with the compounds 1, 25, 14, 7, 30 used in respectively example 9, 10, 11, 12 and 14.

TABLE 2

| Example | Required Thickness for QWP at 550 nm (nm) | Required Thickness for HWP at 550 nm (nm) |
|---|---|---|
| 9 | 353 | 706 |
| 10 | 444 | 888 |
| 11 | 430 | 860 |

TABLE 2-continued

| Example | Required Thickness for QWP at 550 nm (nm) | Required Thickness for HWP at 550 nm (nm) |
|---|---|---|
| 12 | 382 | 764 |
| 14 | 393 | 786 |

The invention claimed is:

1. A compound of formula (I)

(I)

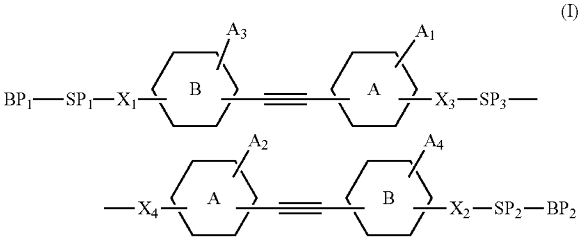

wherein

A represents an unsubstituted or substituted carbocyclic or heterocyclic aromatic group selected from a monocyclic ring of five or six atoms, two adjacent monocyclic rings of five or six atoms, a bicyclic ring system of eight, nine or ten atoms, or a tricyclic ring system of thirteen or fourteen atoms;

B represents an unsubstituted or substituted naphthalene;

$SP_1$, $SP_2$ and $SP_3$ each independently from each other represents a substituted or unsubstituted, straight-chain or branched $C_3$-$C_{18}$ alkylene group, in which one, two, three or four more $CH_2$, CH or C groups are unreplaced or replaced by groups selected from the group consisting of —CH═CH—, —C≡C—, —O—, —S—, —NR'CO—, —COO—, —OOC—, —CONR'—, —OCOO—, —OCONR' with the proviso that the spacer group does not contain two adjacent heteroatoms;

$X_1$, $X_2$, $X_3$ and $X_4$ each independently from each other is selected from the group consisting of —O—, —S—, —NR'—, —CO—, —COO—, —OOC—, —CONR'—, —OCOO—, —OCONR' and a single bond;

R' is selected from the group consisting of hydrogen, a $C_1$-$C_{18}$alkyl group;

$BP_1$ and $BP_2$ each independently from each other represents a polymerizable group, $A_1$, $A_2$, $A_3$ and $A_4$ each independently from each other are selected from the group consisting of hydrogen, —OR, —COOR, —OCOR, —CONR, —OCOOR, —OCONR and a $C_1$-$C_{18}$alkyl group, wherein R is selected from the group consisting of hydrogen, an unsubstituted or substituted carbocyclic or heterocyclic aromatic group selected from a monocyclic ring of five or six atoms, two adjacent monocyclic rings of five or six atoms, a bicyclic ring system of eight, nine or ten atoms, or a tricyclic ring system of thirteen or fourteen atoms; a substituted or unsubstituted, straight-chain or branched $C_{3-18}$alkyl group, in which one, two, three or four more $CH_2$, CH or C groups are unreplaced or replaced by groups selected from the group consisting of —CH═CH—, —C≡C—, —O—, —S—, —NR"CO—, —COO—, —OOC—, —CONR"—, —OCOO—, —OCONR" with the proviso that the spacer group does not contain two adjacent heteroatoms, wherein R" is selected from the group consisting of hydrogen, a $C_1$-$C_{18}$alkyl group.

2. A compound according to claim 1, in which $BP_1$ and $BP_2$ each independently from each other are selected from the group consisting of $CH_2$═C(Ph)—, $CH_2$═CW-COO—, $CH_2$═CH—COO-Ph-, $CH_2$—CW—CO—NH—, $CH_2$—CH—O—, $CH_2$—CH—OOC—, Ph-CH═CH—, $CH_2$—CH-Ph-, $CH_2$═CH-Ph-O—, $R^3$-Ph-CH—CH—COO—, $R^3$—OOC—CH═CH-Ph-O— and 2-W-epoxyethyl, in which W represents hydrogen, chloride, phenyl or a $C_1$-$C_6$alkyl, and $R^3$ represents a $C_1$-$C_6$alkyl with the proviso that when $R^3$ is attached to an aryl group it may also represent hydrogen or a $C_1$-$C_6$alkoxy.

3. A compound according to claim 1, in which $SP_1$, $SP_2$ and $SP_3$ each independently from each other represents a substituted or unsubstituted, straight-chain or branched $C_3$-$C_{12}$ alkylene group, in which one, two, three or four more $CH_2$, CH or C groups are unreplaced or replaced by groups selected from the group consisting of —CH═CH—, —C≡C—, —O—, —S—, —NR'CO—, —COO—, —OOC—, —CONR'—, —OCOO—, —OCONR' with the proviso that the spacer group does not contain two adjacent heteroatoms.

4. A compound according to claim 1, in which the group $X_1$, $X_2$, $X_3$ and $X_4$ each independently from each other are selected from the group consisting of —O—, —COO—, —OOC—, —OCOO—, and a single bond.

5. A compound according to claim 1, in which the groups $A_1$ and $A_2$ each independently from each other are selected from the group consisting of hydrogen, —OR, —COOR, and —OCOR wherein R is selected from the group consisting of $C_1$-$C_{18}$alkyl and; furan, benzene; pyridine, triazine, pyrimidine, naphthalene, phenanthrene, biphenylene or tetralin group, which are unsubstituted or substituted.

6. A compound according to claim 1, in which the groups $A_1$ and $A_2$ each independently from each other are selected from the group consisting of hydrogen, —OR, —COOR, and —OCOR wherein R is selected from the group consisting of $C_1$-$C_{18}$alkyl and; furan, phenylene; pyridine, triazine, pyrimidine, naphthalene, phenanthrene, biphenylene or tetralin group, which are unsubstituted or substituted.

7. A Liquid Crystal Polymer mixture comprising the compound of formula (I) according to claim 1.

8. A Liquid Crystal Polymer network comprising a compound according to claim 1 or a Liquid Crystal Polymer mixture comprising the compound of formula (I) according to claim 1 in polymerised form.

9. A method of manufacturing an optical or an electro-optical device, comprising polymerizing a compound of formula (I) according to claim 1 or a Liquid Crystal Polymer mixture comprising the compound of formula (I) according to claim 1.

10. An optical or electro-optical device comprising a compound of formula (I) according to claim 1, a Liquid Crystal Polymer mixture comprising the compound of formula (I) according to claim 1, or a Liquid Crystal Polymer network comprising a compound according to claim 1 or a Liquid Crystal Polymer mixture comprising the compound of formula (I) according to claim 1 in polymerised form.

11. A method of forming a liquid crystal polymer network, comprising:

forming a liquid crystal polymer layer comprising a compound of formula (I) according to claim 1, or forming a liquid crystal polymer layer from a liquid crystal polymer mixture comprising the compound of formula (I) according to claim 1; and polymerising the liquid crystal polymer layer.

* * * * *